United States Patent
Le et al.

(10) Patent No.: US 12,231,780 B2
(45) Date of Patent: Feb. 18, 2025

(54) SYSTEM AND METHOD FOR FLICKER AVOIDANCE IN MULTI-FRAME MULTI-EXPOSURE IMAGE CAPTURES

(71) Applicant: Samsung Electronics Co., Ltd., Suwon-si (KR)

(72) Inventors: Nguyen Thang Long Le, Richardson, TX (US); Zeeshan Nadir, Richardson, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 18/059,822

(22) Filed: Nov. 29, 2022

(65) Prior Publication Data

US 2023/0254591 A1    Aug. 10, 2023

Related U.S. Application Data

(60) Provisional application No. 63/336,698, filed on Apr. 29, 2022, provisional application No. 63/308,360, filed on Feb. 9, 2022.

(51) Int. Cl.
*H04N 23/745* (2023.01)
*G06T 5/30* (2006.01)
(Continued)

(52) U.S. Cl.
CPC ............ *H04N 23/745* (2023.01); *G06T 5/50* (2013.01); *G06T 7/11* (2017.01); *G06V 10/44* (2022.01);
(Continued)

(58) Field of Classification Search
CPC .. H04N 23/745; H04N 23/617; H04N 23/743; G06T 5/50; G06T 7/11;
(Continued)

(56) References Cited

U.S. PATENT DOCUMENTS 9,148,583 B2    9/2015  Wu et al.
9,686,505 B2 *  6/2017  Liu .......................... H04N 5/21
(Continued)

FOREIGN PATENT DOCUMENTS

CN        102025919 B       12/2012
KR    10-2019-0064522 A      6/2019
KR    10-2021-0142383 A     11/2021

OTHER PUBLICATIONS

International Search Report and Written Opinion of the International Searching Authority dated May 23, 2023 in connection with International Patent Application No. PCT/KR2023/001470, 9 pages.

*Primary Examiner* — Ahmed A Berhan

(57) ABSTRACT

A method includes obtaining multiple image frames. The method also includes selecting, using at least one processing device of an electronic device, an asymmetrical image pair from the multiple image frames. The asymmetrical image pair includes a first image frame and a second image frame, where the first image frame has a shorter exposure than the second image frame. The method further includes identifying, using the at least one processing device, one or more features based on the asymmetrical image pair. The method also includes determining, using the at least one processing device, whether the first image frame contains flicker based on the one or more features. In addition, the method includes enabling or disabling, using the at least one processing device, the first image frame as a reference candidate based on the determination whether the first image frame contains flicker.

20 Claims, 14 Drawing Sheets

(51) Int. Cl.
   *G06T 5/50*     (2006.01)
   *G06T 7/11*     (2017.01)
   *G06V 10/44*    (2022.01)
   *G06V 10/74*    (2022.01)

(52) U.S. Cl.
   CPC .. *G06V 10/761* (2022.01); *G06T 2207/10144* (2013.01); *G06T 2207/20224* (2013.01)

(58) Field of Classification Search
   CPC ........... G06T 2207/10144; G06T 2207/20224; G06V 10/44; G06V 10/761; G06V 10/7715; G06V 10/772; G06V 10/778
   See application file for complete search history.

(56) References Cited

U.S. PATENT DOCUMENTS

| | | |
|---|---|---|
| 9,955,085 B2 | 4/2018 | Sachs et al. |
| 10,666,874 B2 | 5/2020 | Sun et al. |
| 10,708,515 B2 | 7/2020 | Nakagawara |
| 10,735,669 B2 | 8/2020 | Dewhurst et al. |
| 11,012,634 B2 | 5/2021 | Sugawara et al. |
| 11,082,628 B2 | 8/2021 | Tasdizen et al. |
| 11,128,799 B2 | 9/2021 | Kobayashi |
| 11,284,015 B2 | 3/2022 | Sugawara et al. |
| 2019/0370948 A1* | 12/2019 | Tico .................. G06T 5/92 |
| 2021/0058551 A1 | 2/2021 | Tarifa et al. |
| 2021/0176390 A1 | 6/2021 | Okuike |
| 2021/0314483 A1 | 10/2021 | Sakurabu et al. |

\* cited by examiner

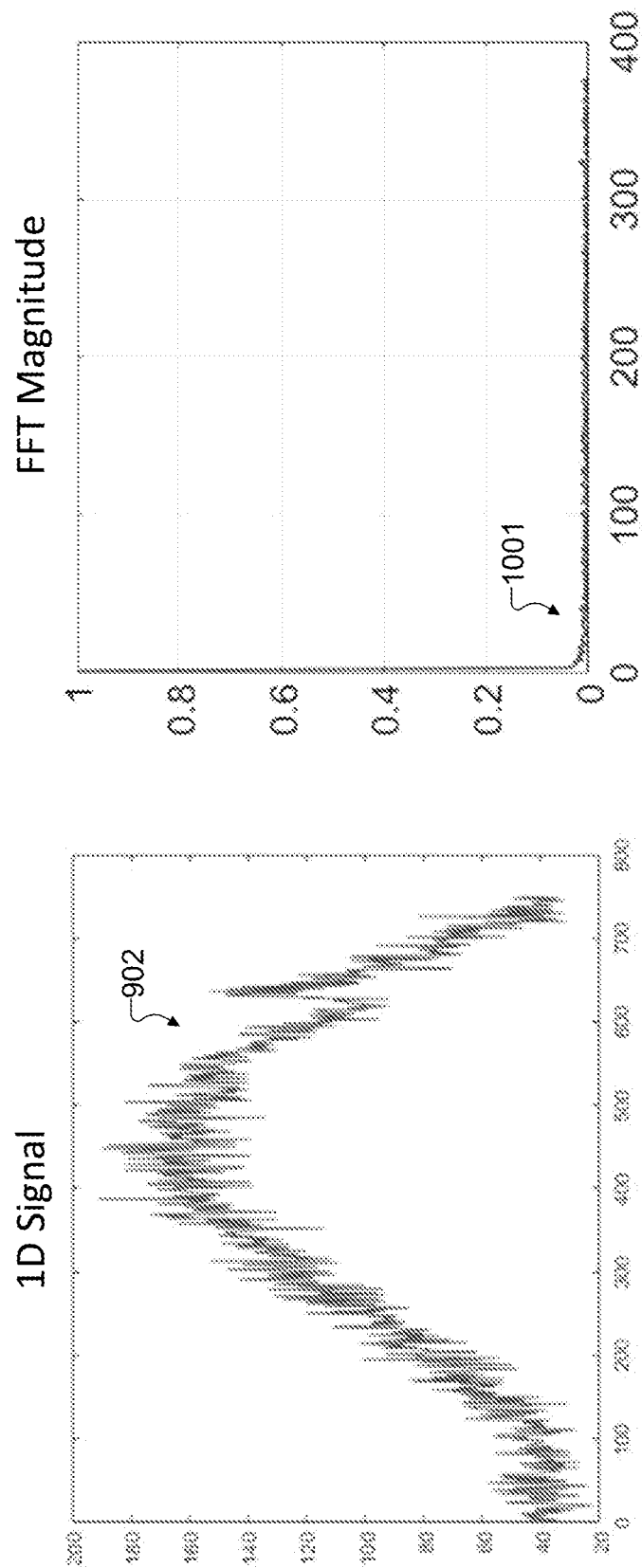

```
Is_Flicker_In_Patch = False
Y = |FFT(P)|
where P is the input patch

If (Y(1) > T₁ or Y(2) > T₁) and Y(3:end) < T₂:
    Is_Flicker_In_Patch = True;
Else:
    Is_Flicker_In_Patch = False;
Endif
```

FIG. 11

SYSTEM AND METHOD FOR FLICKER AVOIDANCE IN MULTI-FRAME MULTI-EXPOSURE IMAGE CAPTURES

CROSS-REFERENCE TO RELATED APPLICATION AND PRIORITY CLAIM

This application claims priority under 35 U.S.C. § 119(e) to U.S. Provisional Patent Application No. 63/308,360 filed on Feb. 9, 2022, and to U.S. Provisional Patent Application No. 63/336,698 filed on Apr. 29, 2022, both of which are hereby incorporated by reference in their entirety.

TECHNICAL FIELD

This disclosure relates generally to imaging systems. More specifically, this disclosure relates to a system and method for flicker avoidance in multi-frame multi-exposure image captures.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices often capture multiple image frames at different exposure values (EVs). EV-0 has a restricted exposure time that avoids flicker artifacts caused by light flickers (such as sinusoidal manifestations of 50 Hz or 60 Hz AC-power light fluctuations due to a rolling shutter). However, short frames (such as frames captured at EV-4, EV-2, etc.) can be susceptible to flicker artifacts. Flicker artifacts can manifest as stain artifacts and/or regions of varying illumination in images.

SUMMARY

This disclosure provides a system and method for flicker avoidance in multi-frame multi-exposure image captures.

In a first embodiment, a method includes obtaining multiple image frames. The method also includes selecting, using at least one processing device of an electronic device, an asymmetrical image pair from the multiple image frames. The asymmetrical image pair includes a first image frame and a second image frame, where the first image frame has a shorter exposure than the second image frame. The method further includes identifying, using the at least one processing device, one or more features based on the asymmetrical image pair. The method also includes determining, using the at least one processing device, whether the first image frame contains flicker based on the one or more features. In addition, the method includes enabling or disabling, using the at least one processing device, the first image frame as a reference candidate based on the determination whether the first image frame contains flicker.

In a second embodiment, an electronic device includes at least one processing device configured to obtain multiple image frames. The at least one processing device is also configured to select an asymmetrical image pair from the multiple image frames. The asymmetrical image pair includes a first image frame and a second image frame, where the first image frame has a shorter exposure than the second image frame. The at least one processing device is further configured to identify one or more features based on the asymmetrical image pair. The at least one processing device is also configured to determine whether the first image frame contains flicker based on the one or more features. In addition, the at least one processing device is configured to enable or disable the first image frame as a reference candidate based on the determination whether the first image frame contains flicker.

In a third embodiment, a non-transitory machine-readable medium contains instructions that when executed cause at least one processor of an electronic device to obtain multiple image frames. The medium also contains instructions that when executed cause the at least one processor to select an asymmetrical image pair from the multiple image frames. The asymmetrical image pair includes a first image frame and a second image frame, where the first image frame has a shorter exposure than the second image frame. The medium further contains instructions that when executed cause the at least one processor to identify one or more features based on the asymmetrical image pair. The medium also contains instructions that when executed cause the at least one processor to determine whether the first image frame contains flicker based on the one or more features. In addition, the medium contains instructions that when executed cause the at least one processor to enable or disable the first image frame as a reference candidate based on the determination whether the first image frame contains flicker.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 10A and 10B illustrate an example determination of a fast Fourier transform (FFT) frequency signal from a one-dimensional signal to determine a dominant frequency according to this disclosure;

FIG. 11 illustrates example pseudocode representing detection logic of a patch according to this disclosure;

DETAILED DESCRIPTION

Figure 1:
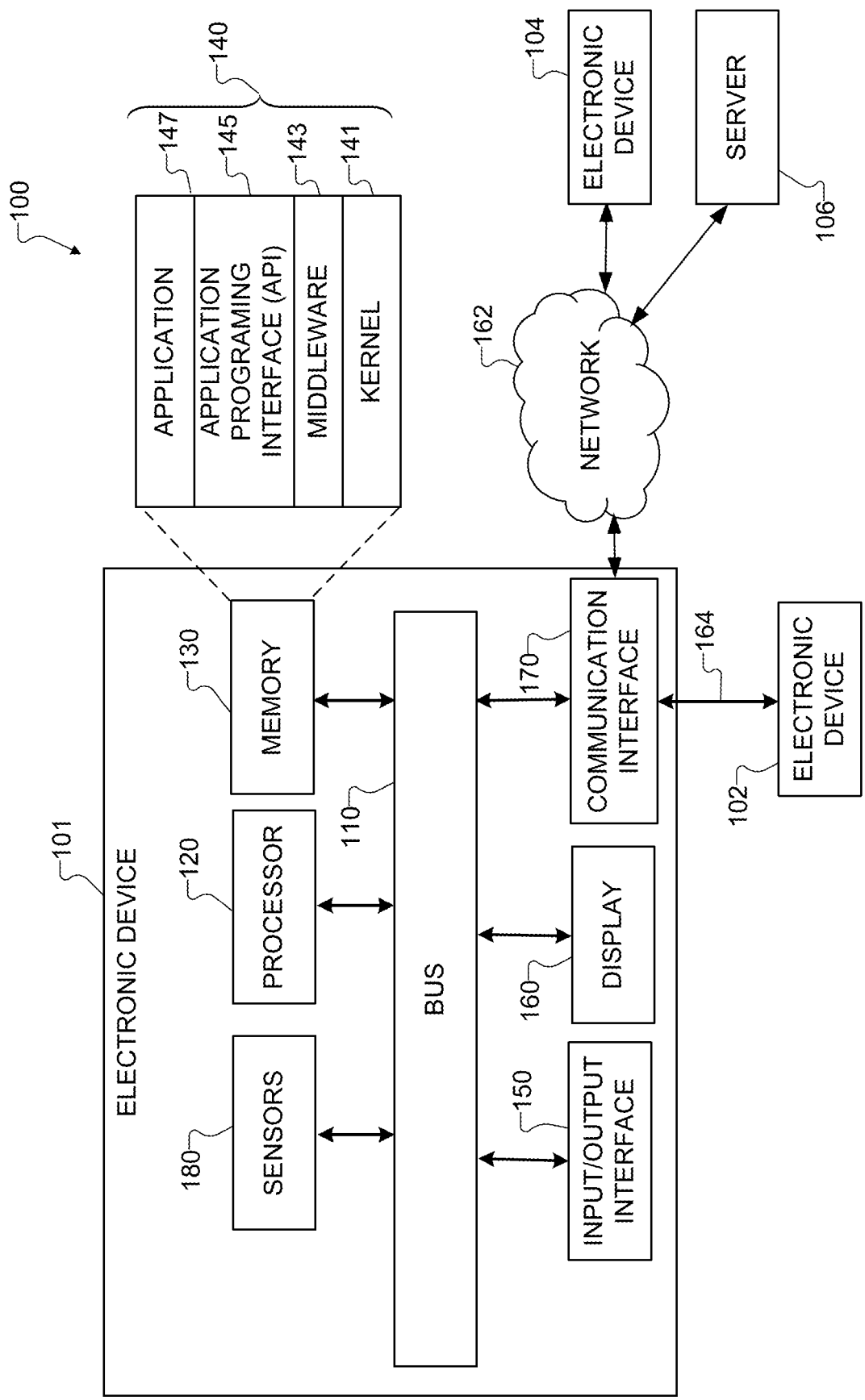
FIG. 1 illustrates an example network configuration including an electronic device according to this disclosure.

FIGS. 1 through 13, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, many mobile electronic devices, such as smartphones and tablet computers, include cameras that can be used to capture still and video images. While convenient, cameras on mobile electronic devices typically suffer from a number of shortcomings. For example, cameras on mobile electronic devices often capture multiple image frames at different exposure values (EVs). EV-0 has a restricted exposure time that avoids flicker artifacts caused by light flickers (such as sinusoidal manifestations of 50 Hz or 60 Hz AC-power light fluctuations due to a rolling shutter). However, short frames (such as frames captured at EV-4, EV-2, etc.) can be susceptible to flicker artifacts. Flicker artifacts can manifest as stain artifacts and/or regions of varying illumination in images.

Flicker can be difficult to control or avoid in various circumstances. For example, the frequency of the flicker can depend on (i) the AC power frequency of a lighting source (such as either 50 Hz or 60 Hz) and (ii) the rolling shutter frequency of a device capturing image frames. Hence, it is difficult to determine the frequency of the flicker that is present in an image. Moreover, the flicker may not be uniform across some image frames, such as when only part of an image frame is illuminated by an AC lighting source while other parts are not. As mentioned above, EV-0 is flicker-free. However, EV-0 cannot address the issue of saturated ghosts and thus is not good for high dynamic range (HDR) recovery. Conversely, short reference frames (such as frames captured at EV-4, EV-2, etc.), although prone to flicker artifacts, are useful in addressing saturated ghosts. As a result, it may be necessary or desirable to avoid using short frames (such as EV-4, EV-2, etc.) as reference frames when flicker is detected while still using the short frames as reference frames whenever possible (such as when no flicker is detected) for high-quality HDR recovery.

This disclosure provides various techniques for flicker avoidance in multi-frame multi-exposure image captures. As described in more detail below, the disclosed systems and methods obtain asymmetrical image pairs from multiple image frames, obtain features based on the image pairs, and determine whether or not one of the image frames in each pair contains flicker. If an image frame contains flicker, that image frame may not be considered as a reference candidate. If an image frame does not contain flicker, that image frame may be considered as a reference candidate. In this way, the disclosed embodiments enable image processing techniques to avoid staining artifacts or other artifacts that can occur due to flicker in reference frames. This results in sharper resulting images, thereby enhancing user experience. Note that while some of the embodiments discussed below are described in the context of use in consumer electronic devices (such as smartphones), this is merely one example. It will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for flicker avoidance in multi-frame multi-exposure image captures.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for flicker avoidance in multi-frame multi-exposure image captures as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for flicker avoidance in multi-frame multi-exposure image captures.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
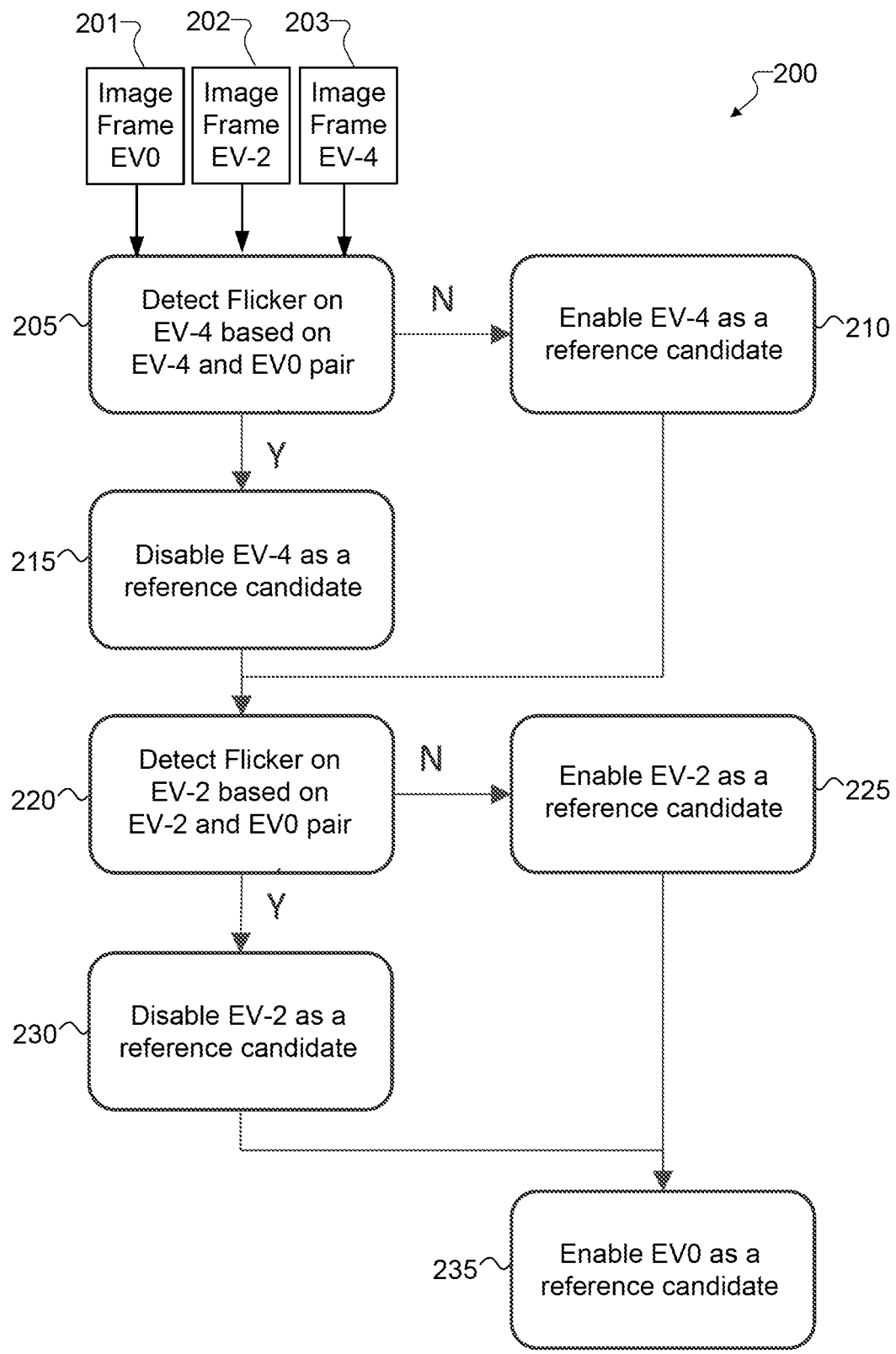
FIG. 2 illustrates an example process for flicker avoidance in multi-frame multi-exposure image captures according to this disclosure.

FIG. 2 illustrates an example process 200 for flicker avoidance in multi-frame multi-exposure image captures according to this disclosure. The flicker avoidance process 200 is based on examination of asymmetrical image frame pairs, where (i) each pair includes a first image frame and a second image frame and (ii) the first image frame has a shorter exposure than the second image frame. For ease of explanation, the process 200 is described as being performed using the electronic device 101 in the network configuration 100 of FIG. 1. However, this is merely one example, and the process 200 could be performed using any other suitable device(s) and in any other suitable system(s), such as when performed using the electronic device 102 or 104 or the server 106.

As shown in FIG. 2, the electronic device 101 obtains multiple image frames 201-203 at different exposures. In some embodiments, the image frames 201-203 can represent images captured by the electronic device 101 in a capture burst using one or more image sensors 180 (such as cameras). In the process 200, the image frames 201-203 include an image frame 201 at the EV-0 exposure, an image frame 202 at the EV-2 exposure, and an image frame 203 at the EV-4 exposure. These exposures are representative examples, and the process 200 can include other or additional image frames at other or additional exposures. The EV-2 image frame 202 and the EV-4 image frame 203 are considered the short exposure frames, and the EV-0 image frame 201 is considered the regular exposure frame. It is assumed that the EV-0 image frame 201 is flicker-free due to its well-conditioned exposure time.

At operation 205, the electronic device 101 determines whether there is flicker in the EV-4 image frame 203 based on an image frame pair containing the EV-4 image frame 203 and the EV-0 image frame 201. There are multiple suitable techniques for detecting flicker in the short frames 202 and 203, and the electronic device 101 can use any of these suitable techniques for detecting flicker in the EV-4 image frame 203. Several example techniques are described in greater detail below. If flicker is not detected in the EV-4 image frame 203, at operation 210, the electronic device 101 enables the EV-4 image frame 203 as a reference candidate. If flicker is detected in the EV-4 image frame 203, at operation 215, the electronic device 101 disables the EV-4 image frame 203 as a reference candidate.

At operation 220, the electronic device 101 determines whether there is flicker in the EV-2 image frame 202 based on the image frame pair containing the EV-2 image frame 202 and the EV-0 image frame 201. To detect flicker in the EV-2 image frame 202, the electronic device 101 can use the same flicker detection technique used in operation 205 or another suitable detection technique, such as one of the other techniques described in greater detail below. If flicker is not detected in the EV-2 image frame 202, at operation 225, the electronic device 101 enables the EV-2 image frame 202 as a reference candidate. If flicker is detected in the EV-2 image frame 202, at operation 230, the electronic device 101 disables the EV-2 image frame 202 as a reference candidate. At operation 235, the electronic device 101 enables the EV-0 image frame 201 as a reference candidate, since the EV-0 image frame 201 is assumed to be flicker-free.

As shown in FIG. 2, in the process 200, the EV-0 image frame 201 is always enabled as a reference candidate. The EV-4 image frame 203 and the EV-2 image frame 202 can also be enabled as reference candidates depending on whether or not these short frames contain flicker. If both the EV-4 image frame 203 and the EV-2 image frame 202 contain flicker, only EV-0 is used as a reference candidate. By allowing for more than one reference candidate, the process 200 provides more choices for a subsequent reference selector in a downstream image processing technique.

Although FIG. 2 illustrates one example of a process 200 for flicker avoidance in multi-frame multi-exposure image captures, various changes may be made to FIG. 2. For example, while described as involving a specific sequence of operations, various operations of the techniques described with respect to FIG. 2 could overlap, occur in parallel, occur in a different order, or occur any number of times (including zero times). As a particular example, the detection of flicker in the EV-2 image frame 202 could occur before or in parallel with the detection of flicker in the EV-4 image frame 203. Also, the exposure levels of the short frames 202 and 203 could include exposure levels other than or in addition to EV-2 and EV-4. In addition, the specific operations shown in FIG. 2 are examples only, and other techniques could be used to perform each of the operations shown in FIG. 2.

FIGS. 3 through 6 illustrate example processes 300, 400, 500, 600 for detecting flicker in multi-frame multi-exposure image captures according to this disclosure. Each of the processes 300, 400, 500, 600 may be used for flicker detection in the process 200, such as in operations 205 and 220. As described in greater detail below, the process 300 uses maximum likelihood (ML) estimates for both unknown flicker frequency and spatial location. The process 400 uses maximum a posteriori (MAP) estimates for both unknown flicker frequency and spatial location. The process 500 uses heuristic or ad-hoc estimates for both unknown flicker frequency and spatial location. The process 600 uses machine learning techniques for both unknown flicker frequency and spatial location. The flicker detection processes 300, 400, 500, 600 are based on examination of asymmetrical image frame pairs, where (i) each pair includes a first image frame and a second image frame and (ii) the first image frame has a shorter exposure than the second image frame. For example, the first image frame may represent the EV-4 image frame 203 or the EV-2 image frame 202, and the second image frame may represent the EV-0 image frame 201. For ease of explanation, each of the processes 300, 400, 500, 600 is described as being performed using the electronic device 101 in the network configuration 100 of FIG. 1. However, this is merely one example, and each of the processes 300, 400, 500, 600 could be performed using any other suitable device(s) and in any other suitable system(s), such as when performed using the electronic device 102 or 104 or the server 106.

Figure 3:
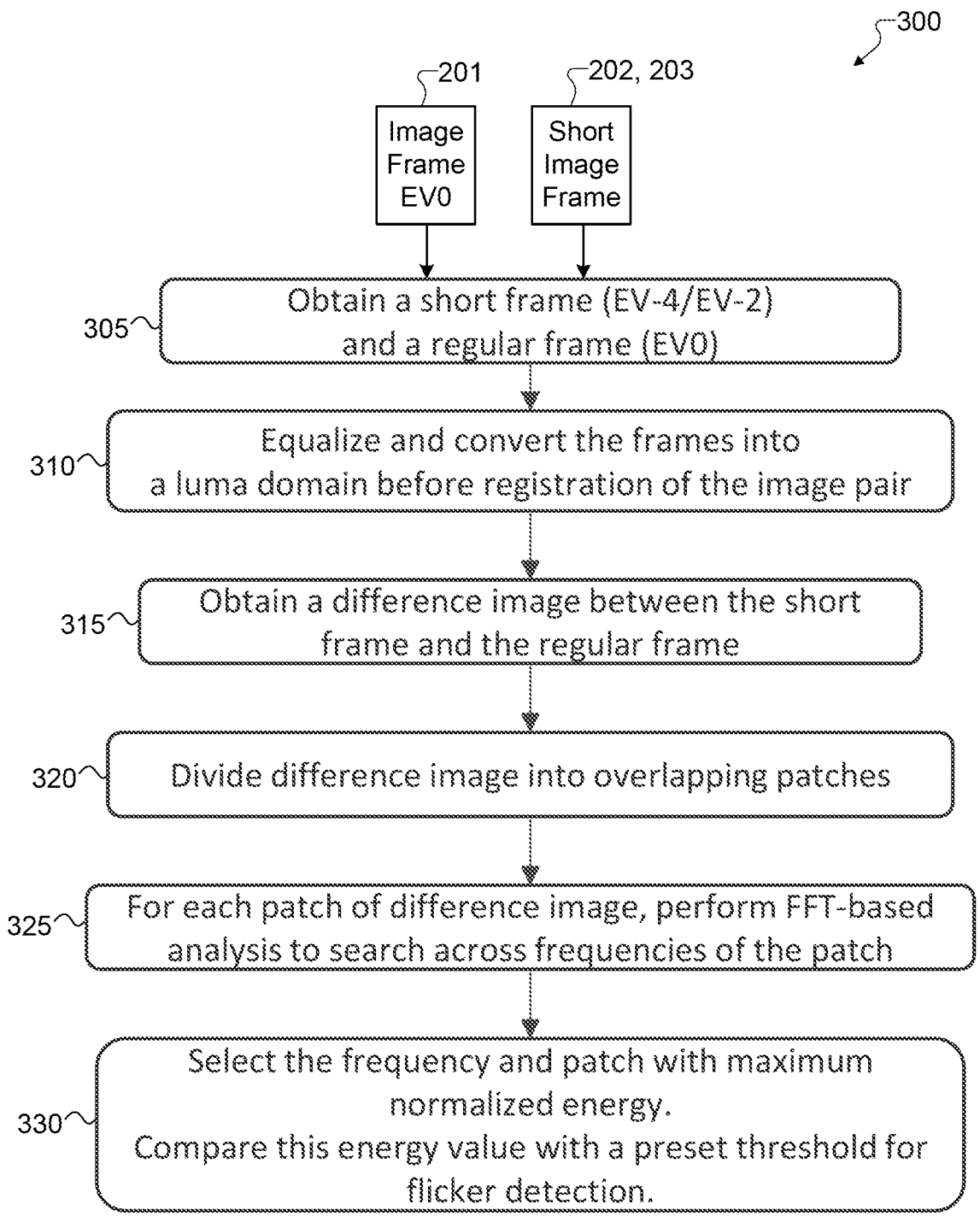
FIGS. 3 through 6 illustrate example processes for detecting flicker in multi-frame multi-exposure image captures according to this disclosure.

As shown in FIG. 3, the process 300 uses ML estimates for both unknown flicker frequency and spatial location. At operation 305, the electronic device 101 obtains an asymmetrical image pair including two image frames having different exposures, such as the EV-4 image frame 203 and the EV-0 image frame 201 or the EV-2 image frame 202 and the EV-0 image frame 201. At operation 310, the electronic device 101 equalizes and converts the image frames of the image pair into a luma-chroma (YUV) domain before registration of the image pair. The equalization and conversion to the YUV domain represent basic image pre-processing techniques to prepare the image pair for analysis. Any suitable techniques for equalization and conversion to the YUV domain (including those currently known and those that are developed in the future) or other domain can be used in the operation 310.

Figure 7:
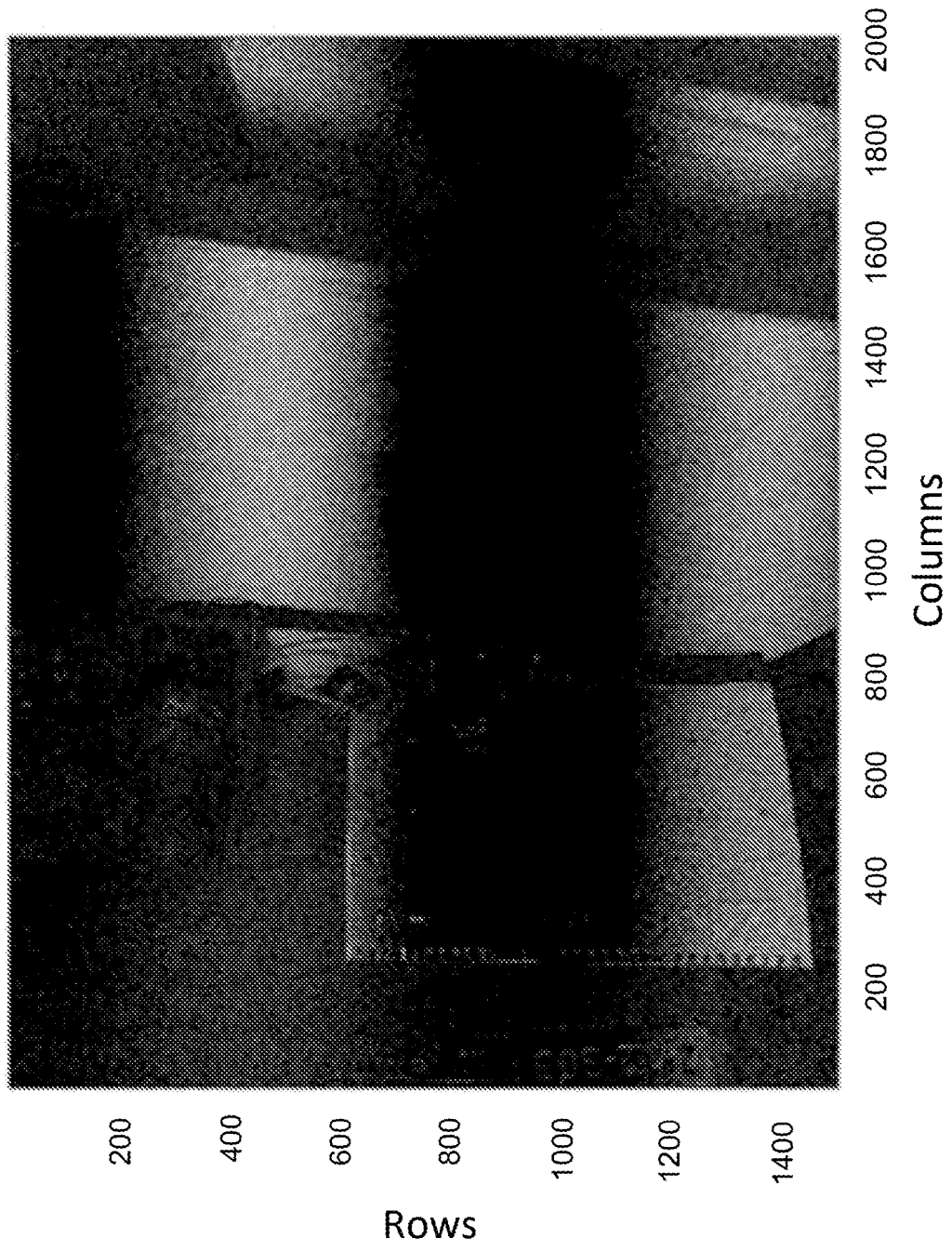
FIG. 7 illustrates an example difference image according to this disclosure.

At operation 315, the electronic device 101 determines an absolute difference image between the image frames. In some embodiments, the difference image is computed using a pixel-wise subtraction between the pre-processed image frames and taking the absolute value of each pixel difference. The computation of the difference image provides a baseline that reveals any sinusoidal flicker artifacts in the shorter exposure frame. FIG. 7 illustrates an example difference image 700 according to this disclosure. Here, the difference image 700 was computed based on a difference between a shorter exposure frame (such as the EV-4 image frame 203 or the EV-2 image frame 202) and a longer exposure frame (such as the EV-0 image frame 201). As shown in FIG. 7, the difference image 700 can be arranged in rows and columns that correspond to the rows and columns of the image frames.

Figure 8:
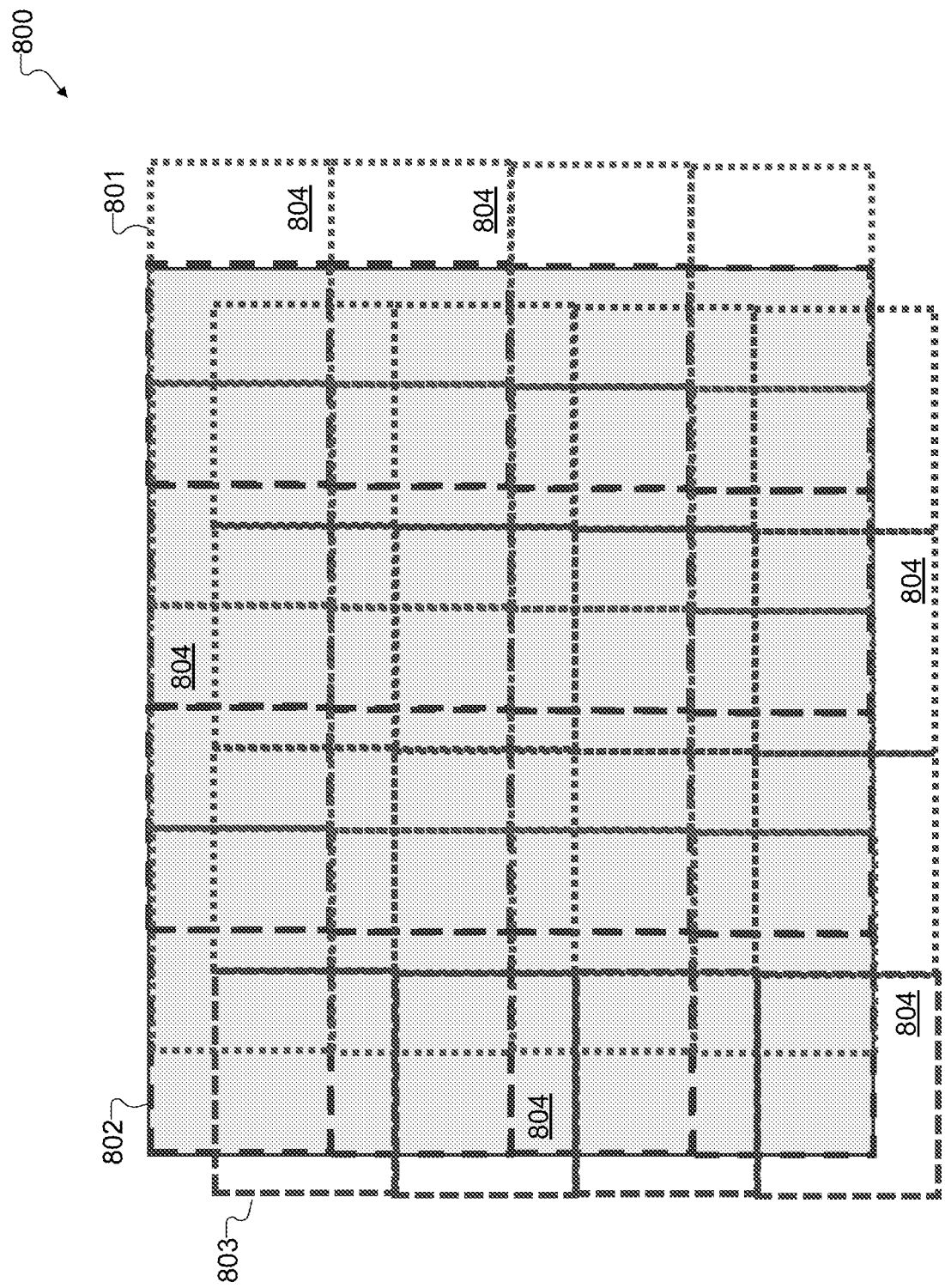
FIG. 8 illustrates an example difference image divided into multiple sets of patches according to this disclosure.

At operation 320, the electronic device 101 divides the difference image into overlapping patches in order to search across unknown spatial locations. FIG. 8 illustrates an example difference image 800 (which can represent the difference image 700) divided into multiple sets of patches according to this disclosure. As shown in FIG. 8, the difference image 800 has been divided into three sets 801-803 of image patches 804, although other numbers of sets of image patches can be selected. In this example, each set 801-803 includes sixteen image patches 804 arranged in a 4×4 grid configuration, although other numbers of sets and numbers of image patches may be used. The image patches 804 in one set 801-803 are together the same size as the difference image 800. Thus, if the difference image 800 is a 2,000 pixel by 1,500 pixel image, each image patch 804 may have a size of 500 pixels by 375 pixels. The size of each image patch 804 can be determined based on the size of the difference image 800 and can be predetermined. As another example, in some embodiments, the size of each image patch 804 is 50 pixels wide by one half of the height of the difference image 800. This size has been determined in some experiments as being a good compromise between a patch that is too small (resulting in a low signal-to-noise ratio) and a patch that is too large (which would fail to localize the flicker signal).

Each set 801-803 is offset from other sets 801-803 such that the image patches 804 of different sets 801-803 may overlap. That is, one image patch 804 in the set 801 overlaps with an image patch 804 in at least one of the other sets 802-803. Some sets 801-803 may be offset in the X direction from another set 801-803, such as where the set 801 is offset from the set 802 in the X direction. Also, some sets 801-803 may be offset in the Y direction from another set 801-803. Further, some sets 801-803 may be offset in both the X and Y directions from another set 801-803, such as where the set 803 is offset from the sets 801 and 802 in both the X and Y directions. The size(s) of the offset between the sets 801-803 can be set in any suitable manner In some cases, the size(s) of the offset may be predetermined based on the size of each image patch 804. In some embodiments, the offset is determined such that there is 50% overlap between the sets of image patches 804. Any suitable technique can be used for dividing the difference image 800 into multiple sets 801-803 of image patches 804. While FIG. 8 shows three overlapping sets 801-803, other numbers of sets are possible. Also, different numbers of image patches in each set and different sizes of image patches are possible.

At operation 325, the electronic device 101 performs FFT-based analysis on each patch of the difference image to search across the frequencies of each patch. For example, the electronic device 101 may perform the analysis to obtain the dominant frequency (and its associated normalized energy) for each patch. As a particular example, in a rolling camera shutter, the sensor fills in rows of the image turn-by turn. Therefore, the electronic device 101 may average each patch across the columns to obtain a one-dimensional (1D) signal that represents an average brightness across rows of the patch. Once the 1D signal is obtained, the electronic device 101 can perform the FFT analysis of the 1D signal to determine the dominant frequency.

Figures 9A, 9B:
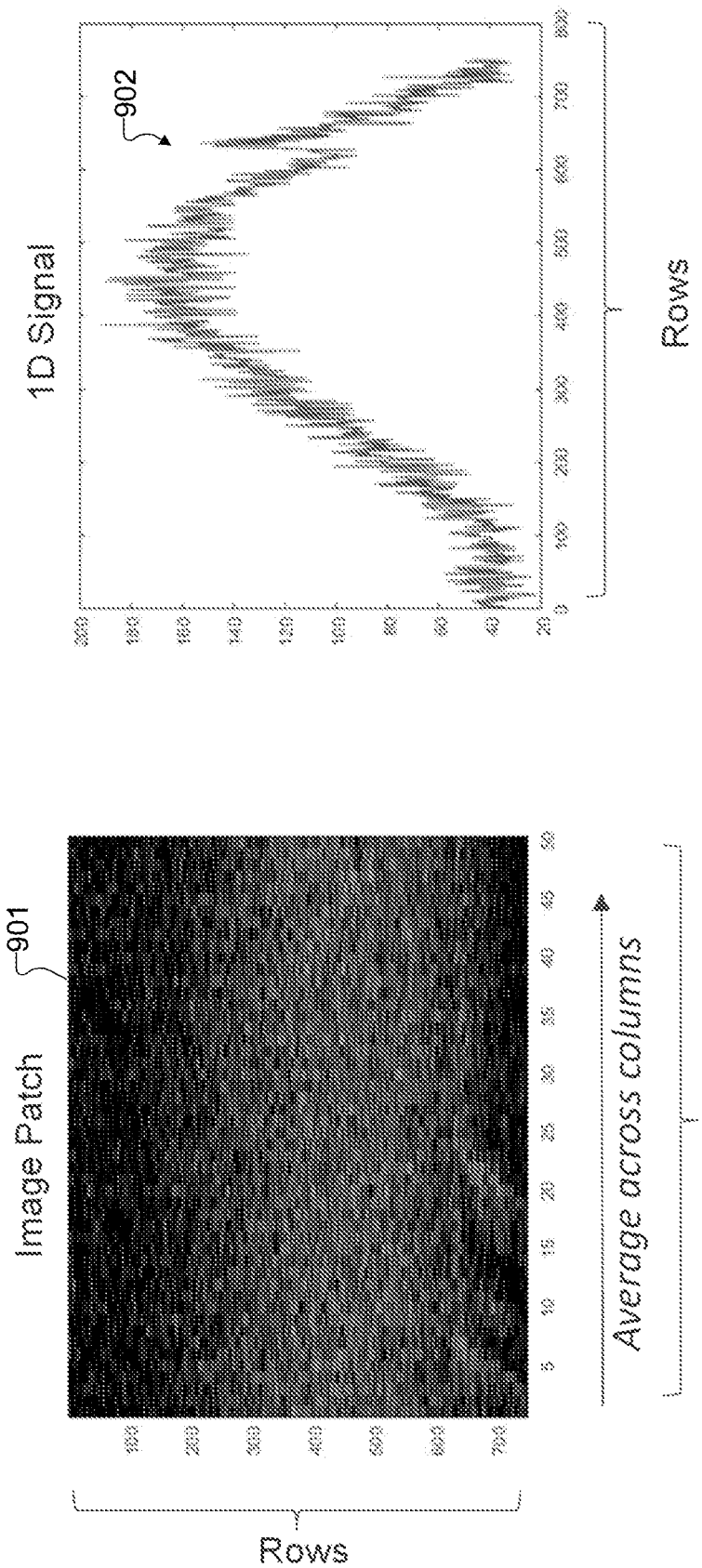
FIGS. 9A and 9B illustrate an example construction of a one-dimensional signal according to this disclosure.

FIGS. 9A and 9B illustrate an example construction of a 1D signal according to this disclosure. In FIG. 9A, an image patch 901 is shown, which can represent one of the image patches 804. The image patch 901 is arranged in rows and columns. The electronic device 101 averages the image patch 901 across the columns to obtain a 1D signal 902 (shown in FIG. 9B) that represents an average brightness across rows of the image patch 901. Patches that have a strong presence of flicker will show a strong sinusoidal component in their 1D signal. This is evident in the case of the image patch 901. The flicker present in the image patch 901 is reflected in the sinusoidal shape of the 1D signal 902. FIGS. 10A and 10B illustrate an example determination of an FFT frequency signal from a 1D signal to determine a dominant frequency according to this disclosure. FIG. 10A shows the 1D signal 902 obtained in conjunction with FIG. 9B. FIG. 10B shows an FFT frequency signal 1001 of the 1D signal 902. From the FFT frequency signal 1001, the electronic device 101 can determine the dominant frequency in the 1D signal 902.

Once the FFT frequency signal 1001 is obtained for each patch, the electronic device 101 selects the frequency and patch with maximum normalized energy at operation 330. The electronic device 101 also compares this maximum normalized energy value with a preset or other specified threshold for flicker detection. Here, normalized energy is a 2D function of frequency and patch location. In particular, the electronic device 101 detects the dominant frequency across each patch based on the FFT frequency signal 1001. The electronic device 101 searches the dominant frequencies across all patches for a largest normalized energy (En1) and compares the largest normalized energy to a preset or other specified threshold (Th1). If En1>Th1, the electronic device 101 determines that flicker is present in the shorter exposure frame. Otherwise, if En1<Th1, the electronic device 101 determines that flicker is not present in the shorter exposure frame. In some embodiments, the threshold Th1 is set to minimize false alarms and a miss detection rate using a dataset with both flicker present and absent.

Figure 4:
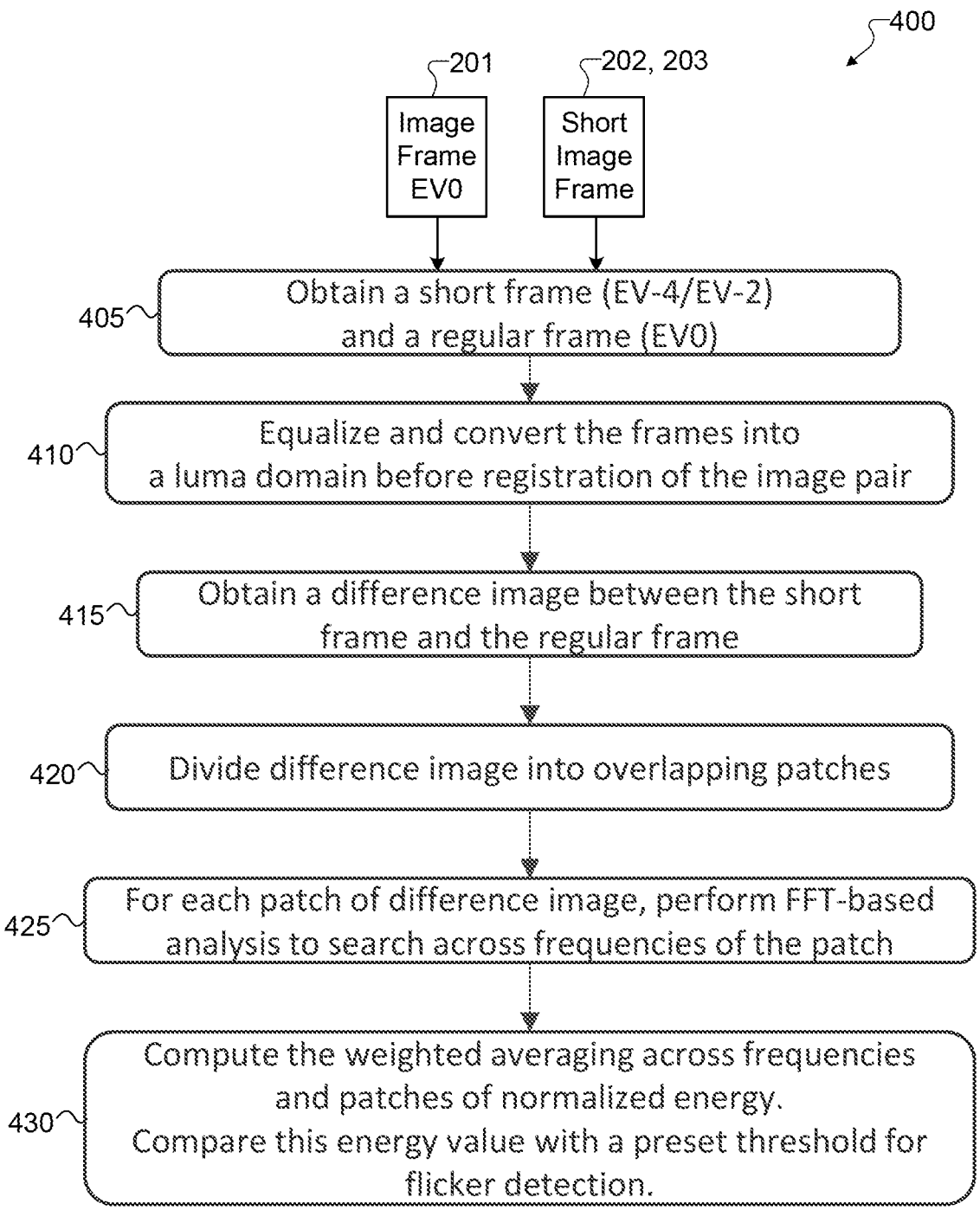

Turning to FIG. 4, the process 400 for detecting flicker in multi-frame multi-exposure image captures will now be described in greater detail. As shown in FIG. 4, the process 400 uses MAP estimates for both unknown flicker frequency and spatial location. The process 400 includes a number of operations that are the same as or similar to corresponding operations in the process 300. For example, operations 405-425 may be the same as or similar to operations 305-325 in the process 300. At operation 405, the electronic device 101 obtains an asymmetrical image pair including two image frames having different exposures, such as the EV-4 image frame 203 and the EV-0 image frame 201 or the EV-2 image frame 202 and the EV-0 image frame 201. At operation 410, the electronic device 101 equalizes and converts the image frames of the image pair into the YUV domain. At operation 415, the electronic device 101 computes an absolute difference image (such as the difference image 700) between the image frames. At operation 420, the electronic device 101 divides the difference image into overlapping patches (such as the image patches 804). At operation 425, the electronic device 101 performs FFT-based analysis on each patch of the difference image to search across the frequencies of each patch. This can include obtaining a 1D signal representing an average brightness across rows of the patch and computing the FFT frequency signal from the 1D signal.

Once the FFT frequency signal 1001 is obtained for each patch, the electronic device 101 computes the weighted average of normalized energy across frequencies and patches at operation 430. The electronic device 101 also compares the weighted average energy value with a preset or other specified threshold for flicker detection. The electronic device 101 determines a weighted average of normalized energy (En2) across frequencies and patches. Here, normalized energy is a 2D function of frequency and patch location. To incorporate prior knowledge about the flicker signal (such as knowledge that lower frequency bins and center patches are more likely to contain the flicker signals than others), the electronic device 101 aggregates the energy function across frequencies and patches, weighted by a prior function on each of the frequencies and patches. This decision rule maximizes the a posteriori probability of unknown components. The electronic device 101 compares the weighted average of normalized energy (En2) to a preset or other specified threshold (Th2). If En2>Th2, the electronic device 101 determines that flicker is present in the shorter exposure frame. Otherwise, if En2<Th2, the electronic device 101 determines that flicker is not present in the shorter exposure frame. In some embodiments, the threshold Th2 is set to minimize false alarms and a miss detection rate using a dataset with both flicker present and absent.

Figure 5:
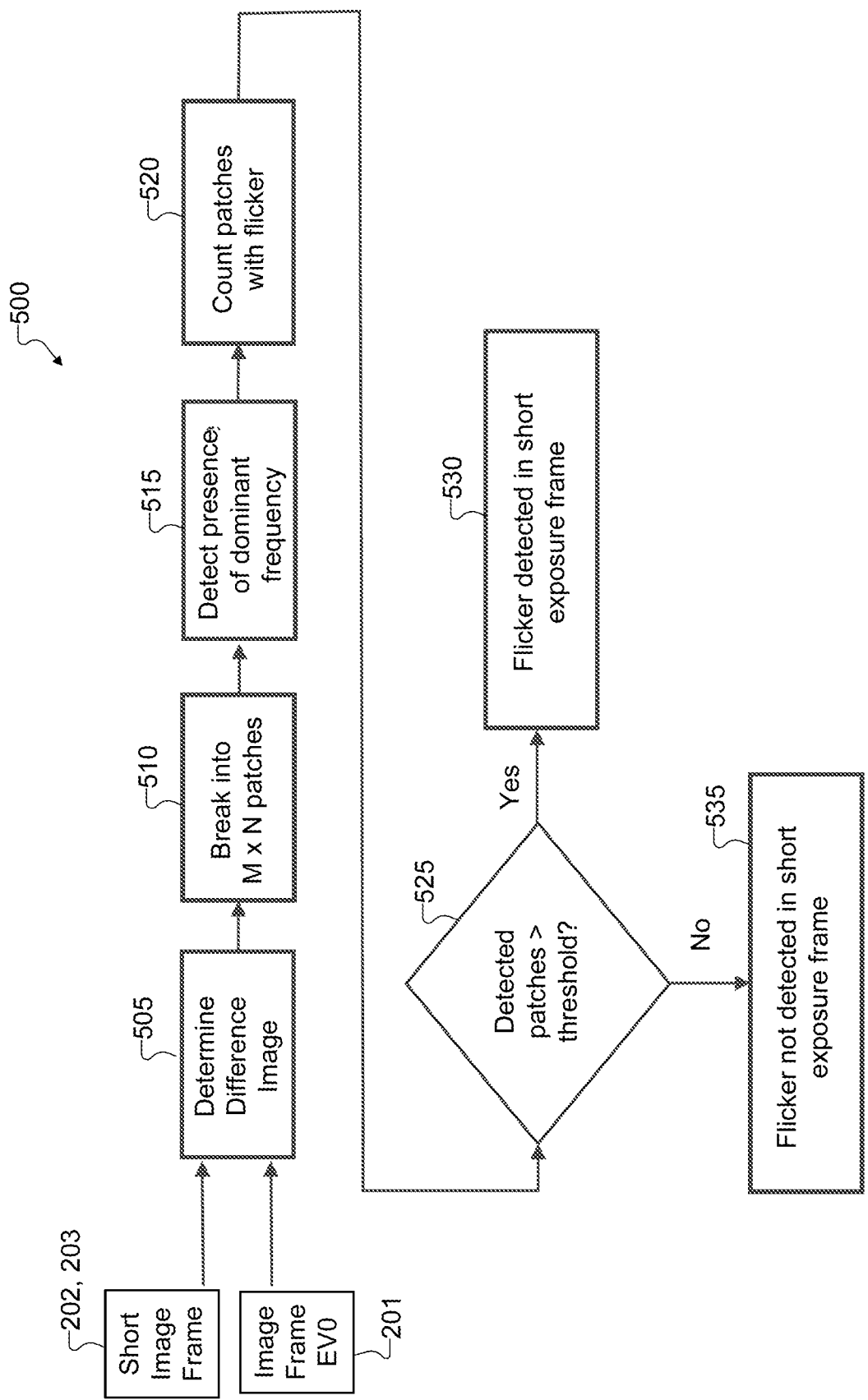

Turning to FIG. 5, the process 500 for detecting flicker in multi-frame multi-exposure image captures will now be described in greater detail. As shown in FIG. 5, the process 500 uses heuristic or ad-hoc estimates for both unknown flicker frequency and spatial location. The process 500 includes a number of operations that are the same as or similar to corresponding operations in the process 500. For example, operations 505-515 may be the same as or similar to operations 305-325 in the process 300. At operation 505, the electronic device 101 obtains an asymmetrical image pair including two image frames having different exposures, such as the EV-4 image frame 203 and the EV-0 image frame 201 or the EV-2 image frame 202 and the EV-0 image frame 201. At operation 505, the electronic device 101 also equalizes and converts the image frames of the image pair into the YUV domain and determines an absolute difference image (such as the difference image 700) between the image frames. At operation 510, the electronic device 101 divides the difference image into overlapping patches (such as the image patches 804). At operation 515, the electronic device 101 performs FFT-based analysis on each patch of the difference image to search across the frequencies and obtain the dominant frequency (and its associated normalized energy) for each patch. This can include obtaining a 1D signal representing an average brightness across rows of the patch and computing the FFT frequency signal from the 1D signal.

At operation 520, the electronic device 101 counts the number of patches in the difference image with flicker present. In some embodiments, the electronic device 101 uses the FFT frequency signal of the 1D signal to determine whether there is flicker in a given patch. FIG. 11 illustrates example pseudocode 1100 representing detection logic of a patch, which can be used by the electronic device 101 to determine whether there is flicker in the patch. In FIG. 11, it is assumed that the flicker frequency will manifest in Y(1) or Y(2). In FIG. 11, the parameters $T_1$ and $T_2$ are predetermined or other specified threshold values. Examples of the threshold values are $T_1=0.1$ and $T_2=0.1$. Of course, other suitable values are possible. The parameters $T_1$ and $T_2$ can be selected using various techniques, such as heuristic estimates based on empirical observation of an absolute FFT histogram. In some embodiments, the heuristic estimates can be determined by studying the histogram of absolute values of FFT parameters for patches containing flicker and no flicker and studying the scale of the FFT parameters for the two cases.

Instead of setting the parameters $T_1$ and $T_2$, a full regression analysis of the FFT spectrum across training data patches can be performed. In this technique, a linear (or non-linear) model of flicker detection is constructed as a function of FFT coefficients, such as represented by the following equation.

$$t = \log \frac{p}{1-p} = b_0 + b_1 Y_1 + b_2 Y_2 + \ldots + b_n Y_n$$

Here, p is the probability that a patch contains flicker. This equation can be used to train a multi-variable logistic regression model, such as by way of minimizing a cross-entropy loss function, to estimate the parameters $[b_0, b_1, \ldots, b_n]$. Once estimated, the parameters $[b_0, b_1, \ldots, b_n]$ can be used to estimate the probability of flicker in a patch as follows.

$$p = \frac{1}{1 + e^{-(b_0 + b_1 Y_1 + b_2 Y_2 + \ldots + b_n Y_n)}}.$$

At operation 525, the electronic device 101 determines if the number of patches with flicker is greater than a threshold value $T_3$. In some embodiments, the threshold value $T_3$ may be set as a predetermined or other specified percentage of the overall number of patches in the difference image. In other embodiments, the threshold $T_3$ can be chosen to arrive at a trade-off between false positives and false negatives (such as $T_3=0.20$). Of course, other suitable values may be used for the threshold value. If the electronic device 101 determines that the number of patches with flicker is greater than the threshold value (such as greater than a specific percentage), at operation 530, the electronic device 101 determines that flicker is detected in the shorter exposure frame. If the electronic device 101 determines that the number of patches with flicker is not greater than the threshold value, at operation 535, the electronic device 101 determines that flicker is not detected in the shorter exposure frame.

Figure 6:
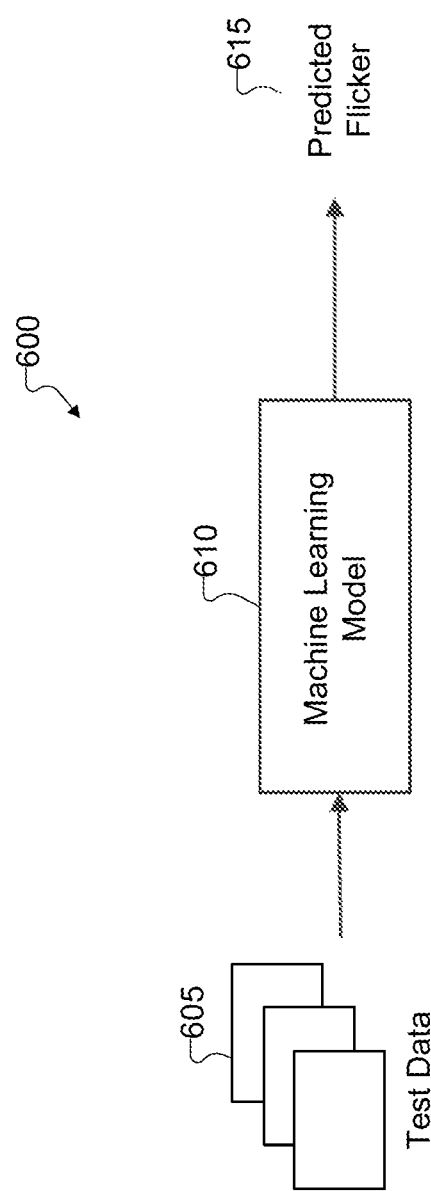

Turning to FIG. 6, the process 600 for detecting flicker in multi-frame multi-exposure image captures will now be described in greater detail. As shown in FIG. 6, the process 600 uses machine learning techniques to determine the presence of flicker in the shorter exposure frame. In the process 600, the electronic device 101 obtains test data 605 and provides the test data 605 as inputs to a machine learning model 610. The test data 605 can include feature vectors that are determined for the machine learning model 610. For example, the feature vectors can include one or more FFT frequency signals of image differences (such as the FFT frequency signal 1001). The machine learning model 610 operates on the test data 605 and outputs a determination 615, which is a prediction of whether flicker is present or not present in the short exposure frame. The machine learning model 610 can represent any suitable machine learning model for predicting flicker. In some embodiments, the machine learning model 610 can be a supervised learning model (such as a linear regression model, a support vector machine (SVM), and the like) or an unsupervised learning model (such as a convolutional neural network or other deep neural network).

Figure 12A:
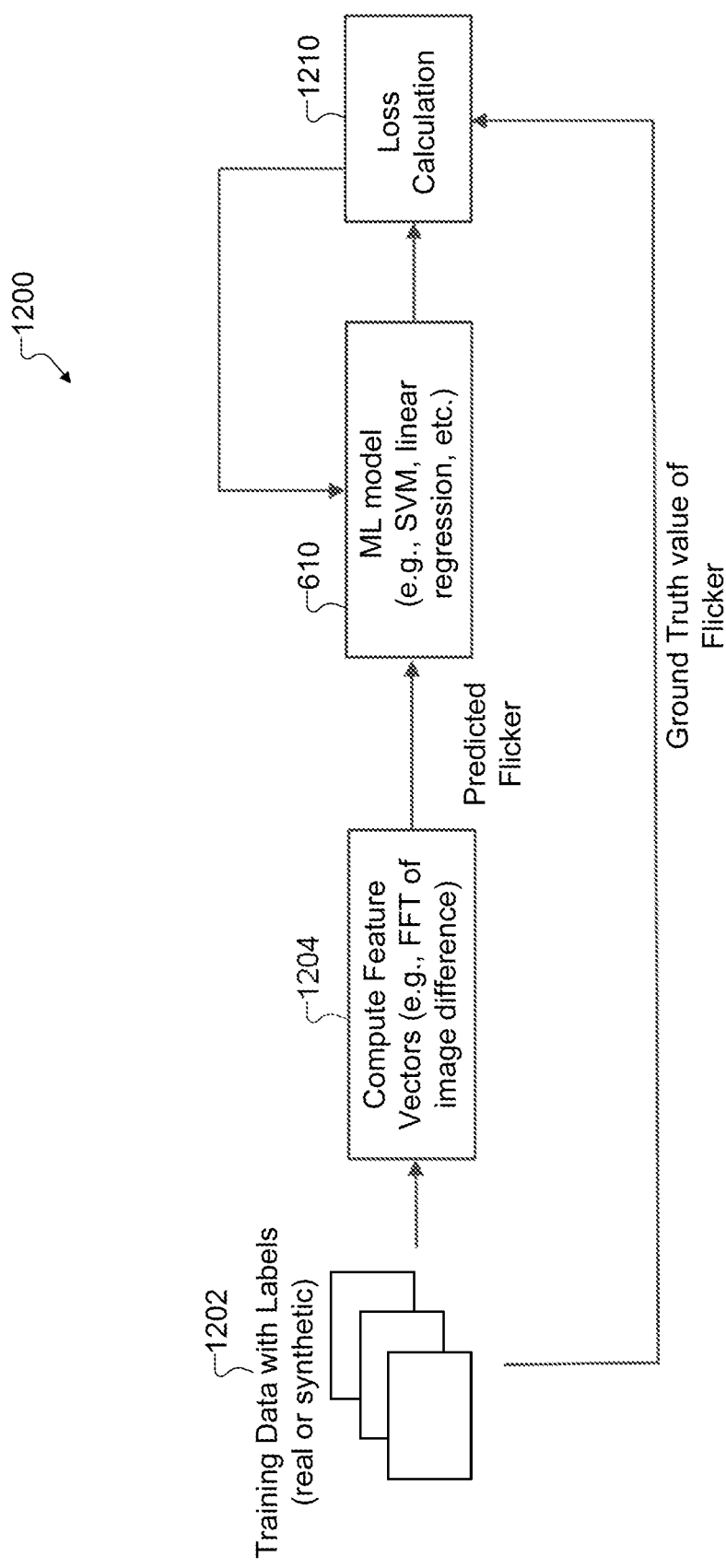
FIGS. 12A and 12B illustrate example processes that can be performed to train a machine learning model according to this disclosure.
Figure 12B:
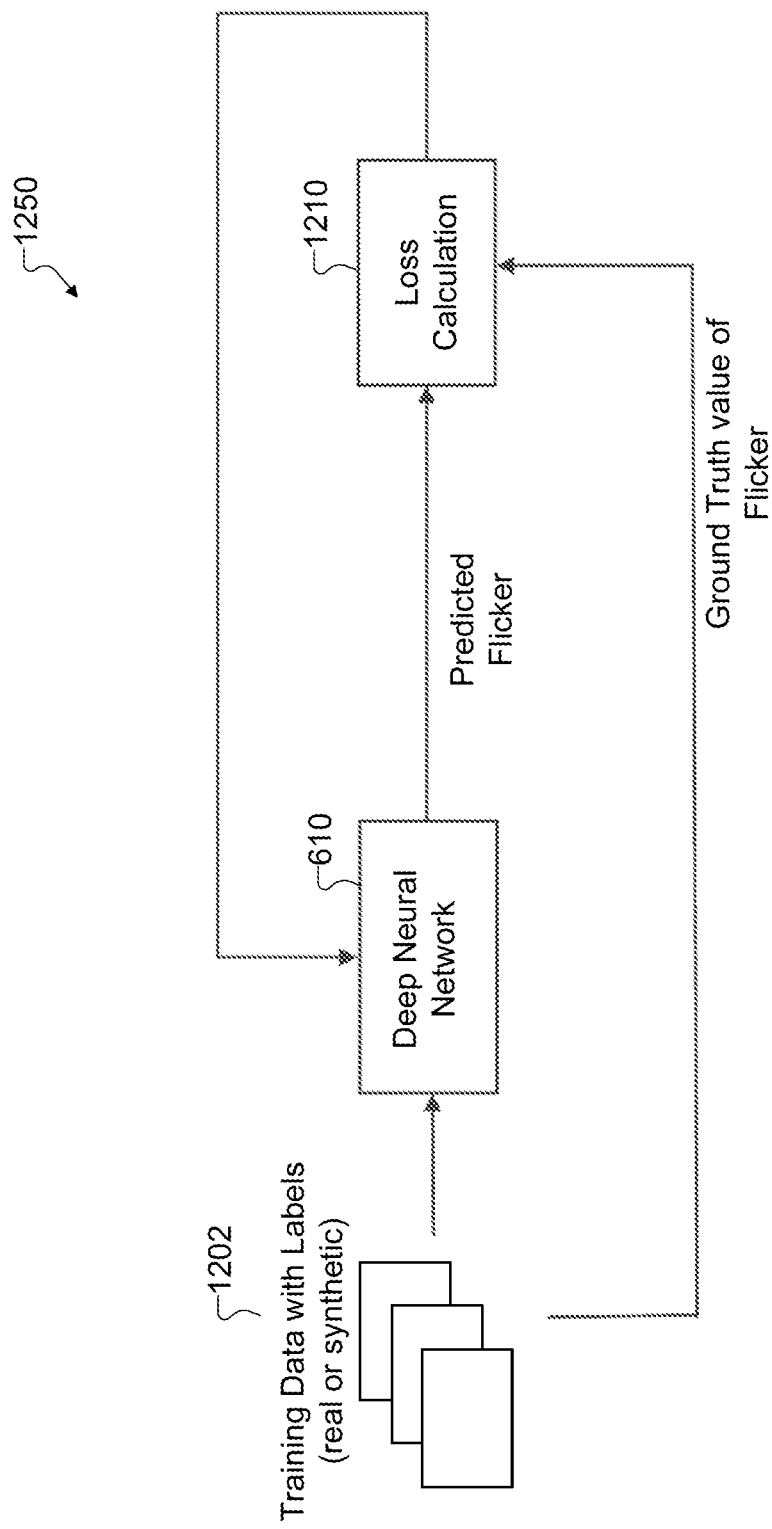

FIGS. 12A and 12B illustrate example processes that can be performed to train the machine learning model 610 according to this disclosure. In particular, FIG. 12A shows a process 1200 for training a supervised learning model, and FIG. 12B shows a process 1250 for training an unsupervised learning model. For ease of explanation, the processes 1200 and 1250 are described as being performed using the server 106 in the network configuration 100 of FIG. 1. However, this is merely one example, and the processes 1200 and 1250 could be performed using any other suitable device(s) and in any other suitable system(s), such as when performed using the electronic device 101, 102, or 104.

As shown in FIG. 12A, the server 106 obtains training data 1202 and computes multiple feature vectors 1204 from the training data 1202. The training data 1202 can be real, synthetic, or a combination of these and can include one or more difference image patches, such as the image patches 804. Each of the training image patches can be associated with one or more labels, such as "Flicker Present" or "Flicker Absent." The computed feature vectors 1204 can include one or more FFT frequency signals of image differences (such as the FFT frequency signal 1001). In some embodiments, the feature vectors 1204 can include pairs of FFT frequency signals, where each pair of FFT frequency signals includes a flicker-free frequency signal and a corresponding frequency signal containing flicker.

The training of the machine learning model 610 is performed iteratively in rounds, where a loss calculation 1210 (such as one using a cross-entropy loss function) is performed in each round. The loss calculation 1210 represents a difference between the flicker predicted by the machine learning model 610 and a ground truth value of flicker for the training data 1202. In some embodiments, the training of the machine learning model 610 can be performed using a machine learning toolbox, such as MATLAB. However, other suitable methods and tools for training can be used. Once trained, the machine learning model 610 can be used to predict presence of flicker in a patch given an absolute FFT frequency signal (such as the FFT frequency signal 1001).

As shown in FIG. 12B, in the process 1250, the server 106 obtains training data 1202, which can be real, synthetic, or a combination of these and can include one or more difference image patches, such as the image patches 804. The training data 1202 can additionally or alternatively include reference image training patches and shorter frame training patches. Each of the training image patches can be associated with one or more labels, such as "Flicker Present" or "Flicker Absent." The training data 1202 is provided as input to the machine learning model 610, which in FIG. 12B can be a deep learning network, such as a convolutional neural network. The training of the machine learning model 610 is performed iteratively in rounds, where a loss calculation 1210 (such as one using a cross-entropy loss function) is performed in each round. The loss calculation 1210 represents a difference between the flicker predicted by the machine learning model 610 and a ground truth value of flicker for the training data 1202. In some embodiments, the training of the machine learning model 610 can be performed to predict the probability of flicker in the input image. In particular embodiments, the training of the machine learning model 610 can be performed using a standard deep learning library, such as PYTORCH or TENSORFLOW.

Although FIGS. 3 through 12B illustrate example processes for detecting flicker in multi-frame multi-exposure image captures and related details, various changes may be made to FIGS. 3 through 12B. For example, while described as involving a specific sequence of operations, various operations of the techniques described with respect to FIGS. 3 through 12B could overlap, occur in parallel, occur in a different order, or occur any number of times (including zero times). In addition, the specific operations shown in FIGS. 3 through 12B are examples only, and other techniques could be used to perform each of the operations shown in FIGS. 3 through 12B.

Note that the operations and functions shown in or described with respect to FIGS. 2 through 12B can be implemented in an electronic device 101, server 106, or other device(s) in any suitable manner. For example, in some embodiments, the operations and functions shown in or described with respect to FIGS. 2 through 12B can be implemented or supported using one or more software applications or other software instructions that are executed by the processor 120 of the electronic device 101, server 106, or other device(s). In other embodiments, at least some of the operations and functions shown in or described with respect to FIGS. 2 through 12B can be implemented or supported using dedicated hardware components. In general, the operations and functions shown in or described with respect to FIGS. 2 through 12B can be performed using any suitable hardware or any suitable combination of hardware and software/firmware instructions.

Figure 13:
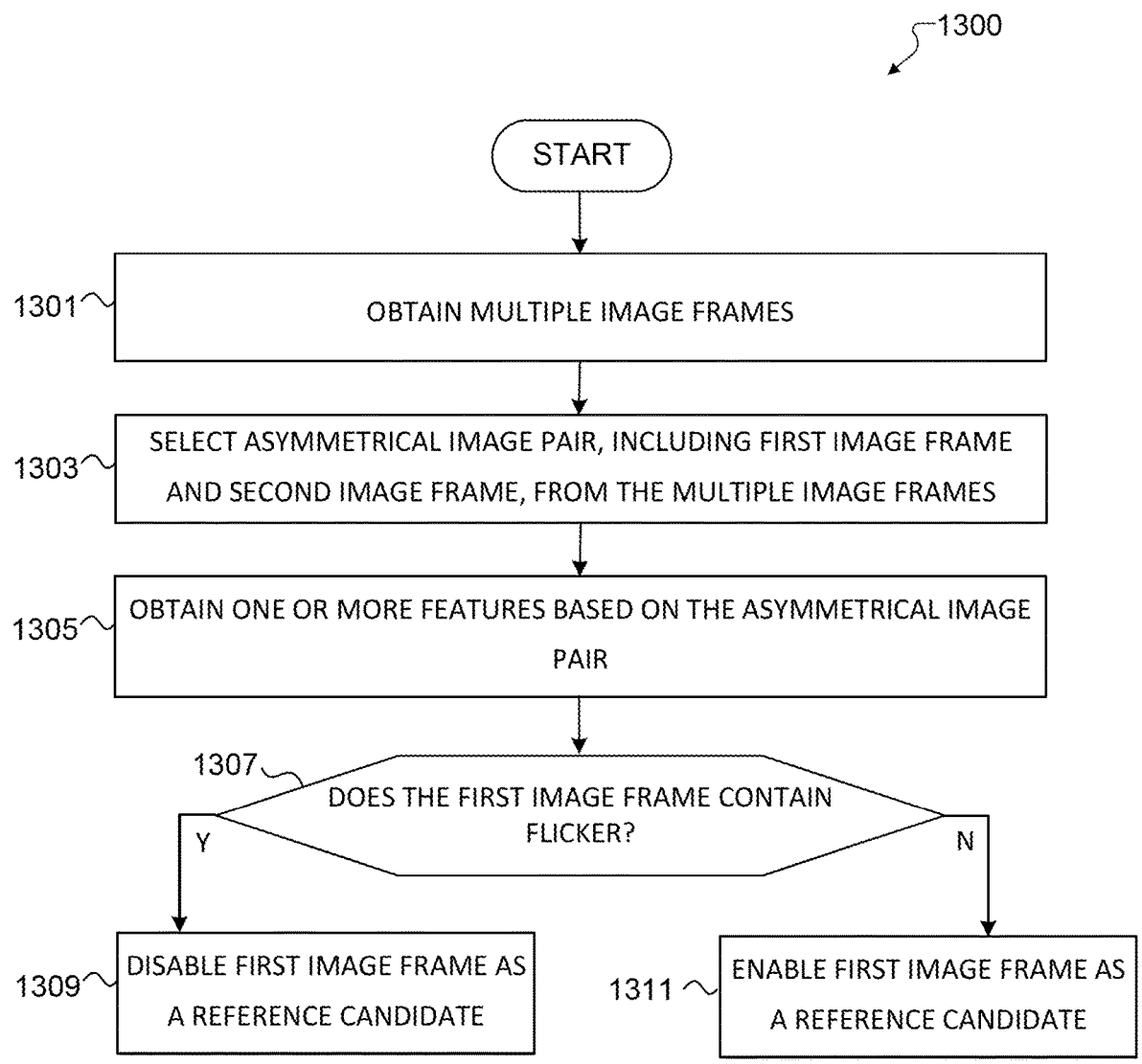
FIG. 13 illustrates an example method for flicker avoidance in multi-frame multi-exposure image captures according to this disclosure.

FIG. 13 illustrates an example method 1300 for flicker avoidance in multi-frame multi-exposure image captures according to this disclosure. For ease of explanation, the method 1300 shown in FIG. 13 is described as being performed using the electronic device 101 and involving one or more of the processes 200, 300, 400, 500, 600 shown in FIGS. 2 through 6. However, the method 1300 shown in FIG. 13 could be used with any other suitable device(s) and in any other suitable system(s) and involve any other suitable process(es).

As shown in FIG. 13, multiple image frames are obtained at step 1301. This could include, for example, the electronic device 101 capturing or otherwise obtaining the image frames 201-203. An asymmetrical image pair is selected from the multiple image frames at step 1303. The asymmetrical image pair includes a first image frame and a second image frame, where the first image frame has a shorter exposure than the second image frame. This could include, for example, the electronic device 101 selecting either the EV-2 image frame 202 and the EV-0 image frame 201 as an image pair or selecting the EV-4 image frame 203 and the EV-0 image frame 201 as an image pair.

One or more features are obtained based on the asymmetrical image pair at step 1305. This could include, for example, the electronic device 101 performing operations of one of the processes 300, 400, 500, 600 (such as the operations 315-325) to determine one or more FFT frequency signals 1001, which are representative of frequency components in a signal representing the average brightness across an image patch. A determination is made whether the first image frame contains flicker based on the one or more features at step 1307. This could include, for example, the electronic device 101 performing operation 205 or 220 to detect flicker in the EV-2 image frame 202 or the EV-4 image frame 203. More specifically, this could include the electronic device 101 performing one or more operations of the process 300, 400, 500, 600 to determine whether the EV-2 image frame 202 or the EV-4 image frame 203 contains flicker.

If it is determined that the first image frame contains flicker, the first image frame is disabled as a reference candidate at step 1309. This could include, for example, the electronic device 101 performing operation 215 to disable the EV-4 image frame 203 as a reference candidate or performing operation 230 to disable the EV-2 image frame 202 as a reference candidate. If it is determined that the first image frame does not contain flicker, the first image frame is enabled as a reference candidate at step 1311. This could include, for example, the electronic device 101 performing operation 210 to enable the EV-4 image frame 203 as a reference candidate or performing operation 225 to enable the EV-2 image frame 202 as a reference candidate.

Although FIG. 13 illustrates one example of a method 1300 for flicker avoidance in multi-frame multi-exposure image captures, various changes may be made to FIG. 13. For example, while shown as a series of steps, various steps in FIG. 13 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
 obtaining multiple image frames;
 selecting, using at least one processing device of an electronic device, an asymmetrical image pair from the multiple image frames, the asymmetrical image pair comprising a first image frame and a second image frame, the first image frame having a shorter exposure than the second image frame;
 identifying, using the at least one processing device, one or more features based on the asymmetrical image pair, wherein identifying the one or more features based on the asymmetrical image pair comprises:
  generating a difference image based on the first image frame and the second image frame; and
  dividing the difference image into patches;
 determining, using the at least one processing device, whether the first image frame contains flicker based on the one or more features; and
 enabling or disabling, using the at least one processing device, the first image frame as a reference candidate based on the determination whether the first image frame contains flicker.

2. The method of claim 1, wherein identifying the one or more features based on the asymmetrical image pair further comprises, for each patch of the difference image:
 identifying a signal representing an average brightness across the patch; and
 identifying a frequency signal representative of frequency components in the signal representing the average brightness across the patch.

3. The method of claim 2, wherein determining whether the first image frame contains flicker comprises:
 detecting a dominant frequency across each patch of the difference image based on the frequency signal for that patch;
 searching the dominant frequencies across all patches for a largest normalized energy;
 comparing the largest normalized energy to a threshold;
 determining that the first image frame contains flicker when the largest normalized energy is greater than the threshold; and
 determining that the first image frame does not contain flicker when the largest normalized energy is less than the threshold.

4. The method of claim 2, wherein determining whether the first image frame contains flicker comprises:
 detecting a dominant frequency across each patch of the difference image based on the frequency signal for that patch;
 determining a weighted average of normalized energy across frequencies and patches;
 comparing the weighted average of normalized energy to a threshold;
 determining that the first image frame contains flicker when the weighted average of normalized energy is greater than the threshold; and
 determining that the first image frame does not contain flicker when the weighted average of normalized energy is less than the threshold.

5. The method of claim 2, wherein determining whether the first image frame contains flicker comprises:
 detecting a dominant frequency across each patch of the difference image based on the frequency signal for that patch;
 determining a number of patches for which the dominant frequency is greater than a first threshold;
 determining that the first image frame contains flicker when the number of patches is greater than a second threshold; and determining that the first image frame does not contain flicker when the number of patches is less than the second threshold.

6. The method of claim 2, wherein:
determining whether the first image frame contains flicker comprises:
providing the frequency signals for the patches to a trained machine learning model; and
determining, using the trained machine learning model, whether the first image frame contains flicker; and
the trained machine learning model has been trained using multiple pairs of frequency signals, each pair of frequency signals including a flicker-free frequency signal and a corresponding frequency signal containing flicker.

7. The method of claim 1, wherein:
the first image frame has an exposure value of EV-4 or EV-2; and
the second image frame has an exposure value of EV-0.

8. An electronic device comprising:
at least one processing device configured to:
obtain multiple image frames;
select an asymmetrical image pair from the multiple image frames, the asymmetrical image pair comprising a first image frame and a second image frame, the first image frame having a shorter exposure than the second image frame;
identify one or more features based on the asymmetrical image pair, wherein, to identify the one or more features based on the asymmetrical image pair, the at least one processing device is configured to:
generate a difference image based on the first image frame and the second image frame; and
divide the difference image into patches;
determine whether the first image frame contains flicker based on the one or more features; and
enable or disable the first image frame as a reference candidate based on the determination whether the first image frame contains flicker.

9. The electronic device of claim 8, wherein, to identify the one or more features based on the asymmetrical image pair, the at least one processing device is further configured, for each patch of the difference image, to:
identify a signal representing an average brightness across the patch; and
identify a frequency signal representative of frequency components in the signal representing the average brightness across the patch.

10. The electronic device of claim 9, wherein, to determine whether the first image frame contains flicker, the at least one processing device is configured to:
detect a dominant frequency across each patch of the difference image based on the frequency signal for that patch;
search the dominant frequencies across all patches for a largest normalized energy;
compare the largest normalized energy to a threshold;
determine that the first image frame contains flicker when the largest normalized energy is greater than the threshold; and
determine that the first image frame does not contain flicker when the largest normalized energy is less than the threshold.

11. The electronic device of claim 9, wherein to determine whether the first image frame contains flicker, the at least one processing device is configured to:
detect a dominant frequency across each patch of the difference image based on the frequency signal for that patch;
determine a weighted average of normalized energy across frequencies and patches;
compare the weighted average of normalized energy to a threshold;
determine that the first image frame contains flicker when the weighted average of normalized energy is greater than the threshold; and
determine that the first image frame does not contain flicker when the weighted average of normalized energy is less than the threshold.

12. The electronic device of claim 9, wherein, to determine whether the first image frame contains flicker, the at least one processing device is configured to:
detect a dominant frequency across each patch of the difference image based on the frequency signal for that patch;
determine a number of patches for which the dominant frequency is greater than a first threshold;
determine that the first image frame contains flicker when the number of patches is greater than a second threshold; and
determine that the first image frame does not contain flicker when the number of patches is less than the second threshold.

13. The electronic device of claim 9, wherein:
to determine whether the first image frame contains flicker, the at least one processing device is configured to:
provide the frequency signals for the patches to a trained machine learning model; and
determine, using the trained machine learning model, whether the first image frame contains flicker; and
the trained machine learning model has been trained using multiple pairs of frequency signals, each pair of frequency signals including a flicker-free frequency signal and a corresponding frequency signal containing flicker.

14. The electronic device of claim 8, wherein:
the first image frame has an exposure value of EV-4 or EV-2; and
the second image frame has an exposure value of EV-0.

15. A non-transitory machine-readable medium containing instructions that when executed cause at least one processor of an electronic device to:
obtain multiple image frames;
select an asymmetrical image pair from the multiple image frames, the asymmetrical image pair comprising a first image frame and a second image frame, the first image frame having a shorter exposure than the second image frame;
identify one or more features based on the asymmetrical image pair, wherein the instructions that when executed cause the at least one processor to identify the one or more features based on the asymmetrical image pair comprise instructions that when executed cause the at least one processor to:
generate a difference image based on the first image frame and the second image frame; and
divide the difference image into patches;
determine whether the first image frame contains flicker based on the one or more features; and
enable or disable the first image frame as a reference candidate based on the determination whether the first image frame contains flicker.

16. The non-transitory machine-readable medium of claim 15, wherein the instructions that when executed cause the at least one processor to identify the one or more features based on the asymmetrical image pair further comprise instructions that when executed cause the at least one processor to:
for each patch of the difference image:
identify a signal representing an average brightness across the patch; and
identify a frequency signal representative of frequency components in the signal representing the average brightness across the patch.

17. The non-transitory machine-readable medium of claim 16, wherein the instructions that when executed cause the at least one processor to determine whether the first image frame contains flicker comprise instructions that when executed cause the at least one processor to:
detect a dominant frequency across each patch of the difference image based on the frequency signal for that patch;
search the dominant frequencies across all patches for a largest normalized energy;
compare the largest normalized energy to a threshold;
determine that the first image frame contains flicker when the largest normalized energy is greater than the threshold; and
determine that the first image frame does not contain flicker when the largest normalized energy is less than the threshold.

18. The non-transitory machine-readable medium of claim 16, wherein the instructions that when executed cause the at least one processor to determine whether the first image frame contains flicker comprise instructions that when executed cause the at least one processor to:
detect a dominant frequency across each patch of the difference image based on the frequency signal for that patch;
determine a weighted average of normalized energy across frequencies and patches;
compare the weighted average of normalized energy to a threshold;
determine that the first image frame contains flicker when the weighted average of normalized energy is greater than the threshold; and
determine that the first image frame does not contain flicker when the weighted average of normalized energy is less than the threshold.

19. The non-transitory machine-readable medium of claim 16, wherein the instructions that when executed cause the at least one processor to determine whether the first image frame contains flicker comprise instructions that when executed cause the at least one processor to:
detect a dominant frequency across each patch of the difference image based on the frequency signal for that patch;
determine a number of patches for which the dominant frequency is greater than a first threshold;
determine that the first image frame contains flicker when the number of patches is greater than a second threshold; and
determine that the first image frame does not contain flicker when the number of patches is less than the second threshold.

20. The non-transitory machine-readable medium of claim 16, wherein:
the instructions that when executed cause the at least one processor to determine whether the first image frame contains flicker comprise instructions that when executed cause the at least one processor to:
provide the frequency signals for the patches to a trained machine learning model; and
determine, using the trained machine learning model, whether the first image frame contains flicker; and
the trained machine learning model has been trained using multiple pairs of frequency signals, each pair of frequency signals including a flicker-free frequency signal and a corresponding frequency signal containing flicker.

* * * * *